United States Patent [19]
Hartmann et al.

[11] 3,821,687
[45] June 28, 1974

[54] ARTICULATED COUPLING FOR CONNECTING ELECTRICALLY CONDUCTIVE PARTS

[75] Inventors: Hans Hartmann; Georg-Heinz Krieter, both of Baden; Gerhard Mauthe, Wettingen, all of Switzerland

[73] Assignee: BBC Brown Boveri & Company Limited, Baden, Switzerland

[22] Filed: Aug. 24, 1972

[21] Appl. No.: 283,287

[30] Foreign Application Priority Data
Oct. 5, 1971 Switzerland.................. 14554/71

[52] U.S. Cl. .......................... 339/9 R, 339/255 R
[51] Int. Cl. ............................................ H01r 7/28
[58] Field of Search .............. 339/7, 9, 47, 64, 245, 339/255, 262; 287/DIG. 10

[56] References Cited
UNITED STATES PATENTS
699,180  5/1902  Jetter.................... 287/DIG. 10
1,966,234  7/1934  Cox et al................. 339/64 R
2,026,008  12/1935  Williams................. 339/7
2,123,631  7/1938  Koehler.................. 339/64 R

*Primary Examiner*—Richard E. Moore
*Attorney, Agent, or Firm*—Pierce, Scheffler & Parker

[57] ABSTRACT

An articulated coupling of the universal type for connecting the ends of two electrically conductive parts comprises two U-shaped yokes orientated at an angle of 90° relatively to each other and fixed respectively to the parts to be connected, and a connection piece located between the legs of the yokes having a prismatic configuration such as to establish an electrically conducting connection between the side faces of the connection piece and the adjoining inside faces of the yokes. The electrical connection between the prismatic connection piece and the yokes is accomplished by means of pre-stressed arcuate spring strips or plate springs.

7 Claims, 3 Drawing Figures

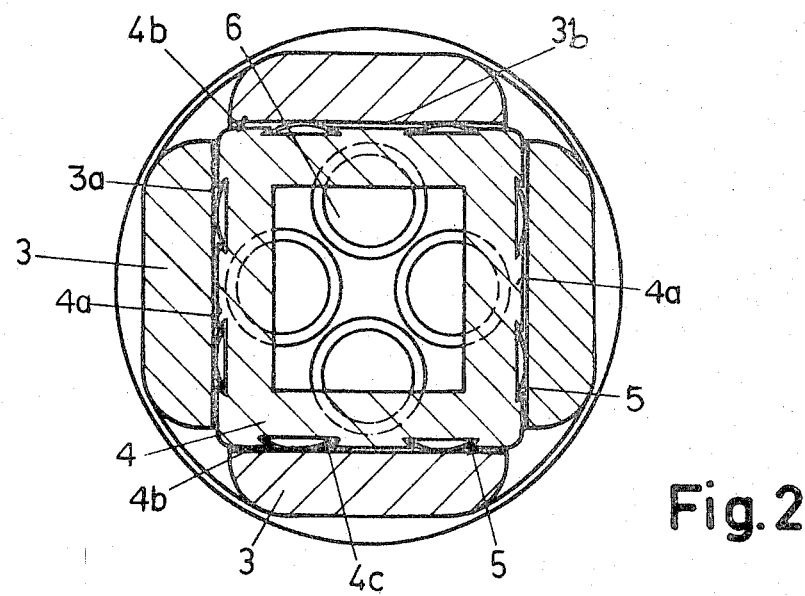
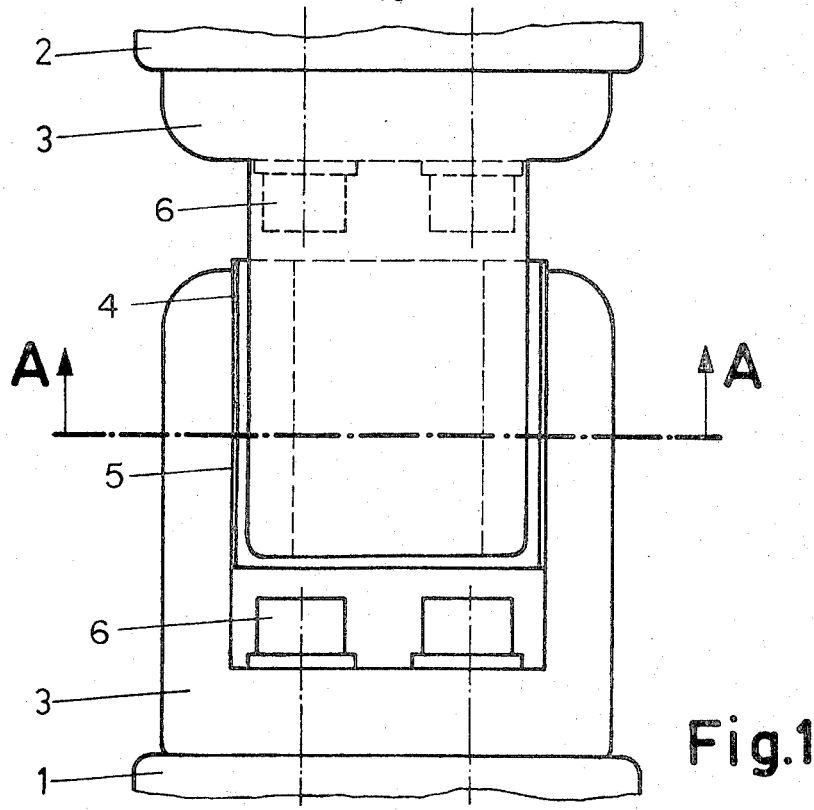

ARTICULATED COUPLING FOR CONNECTING ELECTRICALLY CONDUCTIVE PARTS

The present invention relates to an improved articulated coupling of the universal type for connecting electrically conducting parts wherein a connecting piece is located between yokes provided at the ends of the two parts to be coupled together.

Universal couplings in a wide variety of forms for transmitting torque and also for accommodating axial forces have been known for a long time. An articulated coupling for connecting electrically conducting parts is also known (German Pat. published specification No. 1,119,367) which takes the form of a universal joint in which two yokes carrying the electrically conducting parts engage with and are secured to the connecting piece. Two set pins are located in holes in the connecting piece, the holes containing tapped threads. One or more helices of conducting material are screwed into the threads and serve to transmit current from the set pin to the connecting piece. This form is relatively complex and expensive because of the various components which have to be made comparatively accurately.

The object of the present invention is to create a simple and inexpensive electrically conducting articulated coupling of the kind stated initially above, and which is easily adaptable to different applications. In accordance with the invention, the connecting piece is in the shape of a prismatic body having opposite pairs of sides in electrically conducting connection with the corresponding inside faces of the legs of the yokes, the yokes being orientated at 90° relative to each other and fixed to the electrically conducting connecting parts. This new arrangement has the principal advantage that electrically conducting set pins are eliminated, and the connecting piece is therefore a very simple component.

A preferred embodiment of the invention is illustrated in the accompanying drawings wherein:

FIG. 1 shows an elevation of the articulated coupling;

FIG. 2 is a cross-section at A—A of FIG. 1 and viewed in the direction of the arrows; and, FIG. 3 shows a modification with a connecting piece in two parts, also in cross-section.

Figure 3:
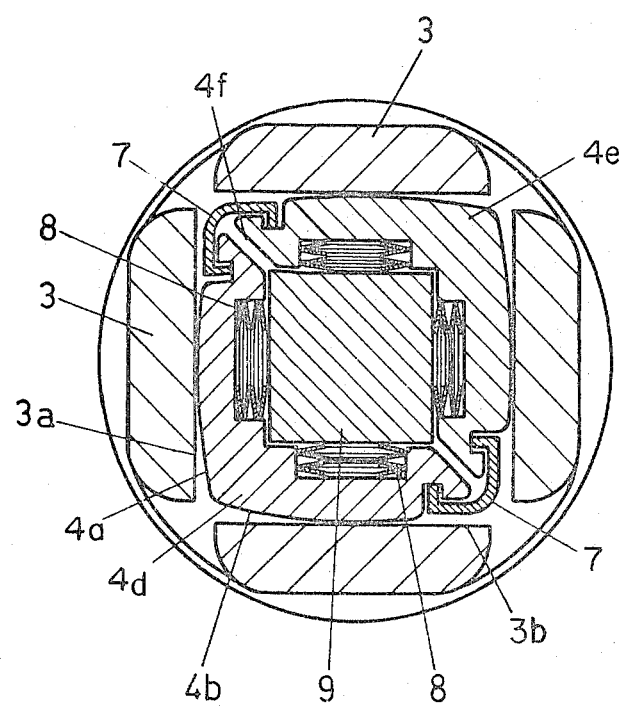

In FIGS. 1 and 2 the two electrically conductive parts to be joined by the articulated coupling are denoted 1 and 2. The yokes 3, orientated relative to each other by an angle of 90°, are attached to parts 1 and 2 by screw bolts 6. Between the yokes 3 is a connecting piece 4, which is in the shape of a prismatic body. In the example shown, the connecting piece 4 has a square cross-section, which has the advantage that yokes 3 can be of identical form. Pairs of sides 4a and 4b of connecting piece 4 are always in contact with the corresponding inside faces 3a, 3b of the legs of the yokes 3. As shown in more detail in FIG. 2, the sides 4a, 4b of the monobloc connecting piece 4 are provided for this purpose with dovetail slots 4c in which pre-tensioned arcuate strip-shaped contact springs 5 are fitted. The strips can be arranged parallel or transverse to the axial direction of the articulated coupling, as required. This new form of articulated coupling represents a simple form of electrical connection adaptable to all axial movements.

In certain cases it may be desirable to provide immediate linear contact between the connecting piece 4 and the inside faces 3a 3b of the legs of yokes 3, instead of the contact springs 5 shown in FIG. 2. In this case the connecting piece can consist of two L-shaped pieces 4d, 4e as shown in FIG. 3, the two dividing gaps 4f between them running diagonally. The sides 4a, 4b of the split connecting pieces 4d, 4e are convex in shape. To facilitate assembly and hold the parts together when assembled, clips 7 are provided, the ends of which can be of such a shape that the parts 4d, 4e of the connecting piece cannot move axially relative to each other. Contact pressure is created by plate springs 8 which bear at one end on the parts 4d, 4e of the connecting piece, and at the other end on the central square shaped filler piece 9.

We claim:

1. An articulated coupling for connecting the ends of two electrically conductive parts which comprises a pair of U-shaped yokes orientated at an angle of 90° relative to each other and fixed respectively to the two parts to be connected, a multi-sided connection piece seated in the rectangular space established between but not joined to the inside faces of the legs of the two yokes, and means including compression springs correlated respectively with the sides of said connection piece for establishing a pressurized electrical connection between the side faces of said connection piece and each of the adjoining inside faces of the legs of said yokes.

2. An articulated coupling as defined in claim 1 for connecting electrically conductive parts wherein said means establishing an electrical connection between the side faces of said connection piece and the adjoining inside faces of the legs of said yokes are constituted by contact springs.

3. An articulated coupling as defined in claim 2 for connecting electrically conductive parts wherein said contact springs are constituted by pre-stressed arcuate spring strips located in slots provided in the side faces of said connection piece.

4. An articulated coupling as defined in claim 1 for connecting electrically conductive parts wherein said connection piece located between the legs of the yokes has a square cross-section.

5. An articulated coupling as defined in claim 1 for connecting electrically conductive parts wherein said connection piece located between the legs of the yokes comprises two L-shaped parts and a square filler piece therebetween, and wherein said electrical connection between the side faces of said connection piece and the adjoining inside faces of the legs of said yokes is established by plate springs located between the side faces of said filler piece and the outside faces of said L-shaped parts and which cause the outside faces of said L-shaped parts to press against the inside faces of the legs of said yokes.

6. An articulated coupling as defined in claim 5 for connecting electrically conductive parts and which further includes clip means embracing and holding the adjoining ends of said L-shaped parts together.

7. An articulated coupling as defined in claim 5 for connecting electrically conductive parts and wherein the outside faces of said L-shaped parts have a convex curvature.

* * * * *

UNITED STATES PATENT OFFICE
CERTIFICATE OF CORRECTION

Patent No. 3,821,687        Dated June 28, 1974

Inventor(s) Hans Hartmann et al

It is certified that error appears in the above-identified patent and that said Letters Patent are hereby corrected as shown below:

Claim 5, line 9, the word "outside" should be:

- inside -

Signed and sealed this 17th day of September 1974.

(SEAL)
Attest:

McCOY M. GIBSON JR.
Attesting Officer

C. MARSHALL DANN
Commissioner of Patents

UNITED STATES PATENT AND TRADEMARK OFFICE

CERTIFICATE EXTENDING PATENT TERM
UNDER 35 U.S.C. 156

Patent No.    : 3,721,687

Dated         : March 20, 1973

Inventor(s)   : Joseph Elks, et al

Patent Owner  : Glaxo Operations
                UK Limited

This is to certify that there has been presented to the

COMMISSIONER OF PATENTS AND TRADEMARKS an application under 35 U.S.C. 156 for an extension of the patent term. Since it appears that the requirements of law have been met, this certificate extends the term of the patent for the period of

2 YEARS with all rights pertaining thereto as provided by 35 USC 156(b).

I have caused the seal of the Patent and Trademark Office to be affixed this Nineteenth day of December 1986.

Donald J. Quigg

Assistant Secretary and Commissioner of Patents and Trademarks